United States Patent
Short et al.

(10) Patent No.: US 10,608,986 B2
(45) Date of Patent: *Mar. 31, 2020

(54) DYNAMIC VPN ADDRESS ALLOCATION

(71) Applicant: VirnetX, Inc., Zephyr Cove, NV (US)

(72) Inventors: Robert Dunham Short, Lexington, VA (US); Victor Larson, Fairfax, VA (US); Michael Williamson, South Riding, VA (US)

(73) Assignee: VirnetX, Inc., Zephyr Cove, NV (US)

(*) Notice: Subject to any disclaimer, the term of this patent is extended or adjusted under 35 U.S.C. 154(b) by 569 days.

This patent is subject to a terminal disclaimer.

(21) Appl. No.: 14/687,875

(22) Filed: Apr. 15, 2015

(65) Prior Publication Data

US 2016/0072763 A1    Mar. 10, 2016

Related U.S. Application Data

(63) Continuation of application No. 13/544,582, filed on Jul. 9, 2012, now Pat. No. 9,027,116.

(Continued)

(51) Int. Cl.
*H04L 29/06* (2006.01)
*H04L 29/12* (2006.01)
*G06F 16/901* (2019.01)

(52) U.S. Cl.
CPC ...... *H04L 61/2046* (2013.01); *G06F 16/9017* (2019.01); *H04L 61/1511* (2013.01);
(Continued)

(58) Field of Classification Search
CPC ........... H04L 29/12264; H04L 61/2046; H04L 63/0272
(Continued)

(56) References Cited

U.S. PATENT DOCUMENTS 6,496,867 B1    12/2002  Beser et al.
6,615,357 B1    9/2003   Boden et al.
(Continued)

FOREIGN PATENT DOCUMENTS

CN    1495631 A      5/2004
CN    101212374 A    7/2008
(Continued)

OTHER PUBLICATIONS

Office action cited in corresponding Japanese Application No. 2014-519097 dated Feb. 23, 2015. English translation attached.
(Continued)

*Primary Examiner* — S M A Rahman
*Assistant Examiner* — Chen-Liang Huang
(74) *Attorney, Agent, or Firm* — Lee & Hayes, P.C.

(57) ABSTRACT

Methods and related systems are presented that relate to automatically avoiding address conflicts when establishing a secure communications link over a public network between a local computer, associated with a local network, and a remote device, located outside the local network. Local network addresses on the local network reserved for use, and a block of local network addresses that do not conflict with the reserved local network addresses, are identified. At least one local network address is selected from the block and assigned as an address of the local device for use in communicating with the remote device securely over the public network. Communication is facilitated with the remote device using the network driver based on the assigned at least one local network address.

32 Claims, 14 Drawing Sheets

Related U.S. Application Data

(60) Provisional application No. 61/505,754, filed on Jul. 8, 2011.

(52) U.S. Cl.
CPC ...... H04L 61/2053 (2013.01); H04L 61/2514 (2013.01); H04L 61/2592 (2013.01); H04L 61/6095 (2013.01); H04L 63/029 (2013.01); H04L 63/0272 (2013.01); H04L 63/0428 (2013.01)

(58) Field of Classification Search
USPC .......................................... 709/241
See application file for complete search history.

(56) References Cited

U.S. PATENT DOCUMENTS

| | | | |
|---|---|---|---|
| 7,085,836 B1 | 8/2006 | Turner | |
| 7,840,701 B2 | 11/2010 | Hsu et al. | |
| 8,265,084 B2 | 9/2012 | Fujino | |
| 9,027,116 B2* | 5/2015 | Short, III | H04L 61/2592 726/15 |
| 2003/0158962 A1 | 8/2003 | Keane et al. | |
| 2004/0148439 A1 | 7/2004 | Harvey et al. | |
| 2005/0066035 A1 | 3/2005 | Williams et al. | |
| 2006/0085851 A1 | 4/2006 | Heninger et al. | |
| 2006/0221955 A1 | 10/2006 | Enright | |
| 2006/0245362 A1* | 11/2006 | Choyi | H04L 12/4633 370/238 |
| 2008/0298367 A1* | 12/2008 | Furukawa | H04L 12/4641 370/392 |
| 2010/0094954 A1 | 4/2010 | Feng et al. | |
| 2011/0013641 A1 | 1/2011 | Kolhi et al. | |
| 2011/0029565 A1* | 2/2011 | Estevez | G06Q 30/02 707/783 |
| 2011/0134907 A1 | 6/2011 | Parolkar et al. | |
| 2011/0154319 A1 | 6/2011 | Carter-Schwendler et al. | |
| 2011/0167475 A1 | 7/2011 | Hoover et al. | |
| 2012/0317252 A1 | 12/2012 | Vemulapalli et al. | |
| 2013/0262587 A1 | 10/2013 | Munger et al. | |
| 2014/0096209 A1 | 4/2014 | Saraf et al. | |
| 2016/0154403 A1* | 6/2016 | Arbogast | G05B 19/0428 700/82 |
| 2019/0141128 A1* | 5/2019 | Hallak | H04L 67/1097 |

FOREIGN PATENT DOCUMENTS

| | | |
|---|---|---|
| CN | 101808038 A | 8/2010 |
| EP | 0817444 | 1/1998 |
| EP | WO2007072254 A1 | 6/2007 |
| JP | 2008301024 | 12/2008 |
| JP | 2009010606 | 1/2009 |
| JP | 2009017429 | 1/2009 |
| JP | 2009171132 | 7/2009 |
| JP | 2010-161823 A | 7/2010 |
| JP | 2011160103 | 8/2011 |
| WO | WO 03/073305 A1 | 9/2003 |
| WO | WO 2007/072254 A1 | 6/2007 |
| WO | WO2007072254 | 6/2007 |
| WO | WO2010041914 | 4/2010 |
| WO | WO 2011/056714 A2 | 5/2011 |

OTHER PUBLICATIONS

International Search Report and the Written Opinion dated Dec. 12, 2012 from Corresponding PCT Application No. PCT/US2012/045921.

* cited by examiner

| Network Driver | IP Address | Network Mask | Gateway |
|---|---|---|---|
| Real Network Driver | 192.168.0.21 | 255.255.255.0 | 192.168.0.1 |
| Virtual Network Driver | 192.168.3.23 | 255.255.255.0 | |

FIG. 2A

| Destination | Network Mask | Device |
|---|---|---|
| 192.168.0.0 | 255.255.255.0 | 192.168.0.21 |
| 192.168.3.0 | 255.255.255.0 | 192.168.3.23 |
| 0.0.0.0 (default) | 0.0.0.0 | 192.168.0.1 |

FIG. 2B

| IP Address | Network Mask |
|---|---|
| 192.168.0.0 | 255.255.0.0 |
| 172.16.0.0 | 255.240.0.0 |
| 10.0.0.0 | 255.0.0.0 |

FIG. 3A

DYNAMIC VPN ADDRESS ALLOCATION

RELATED APPLICATIONS

The present application claims the benefit of priority under 35 U.S.C. § 120 as a continuation of U.S. patent application Ser. No. 13/544,582 entitled "Dynamic VPN Address Allocation," filed on Jul. 9, 2012, which claims the benefit of priority under 35 U.S.C. § 119 from U.S. Provisional Patent Application Ser. No. 61/505,754 entitled "Dynamic VPN Address Allocation," filed on Jul. 8, 2011, the disclosures of which are hereby incorporated by reference in their entirety for all purposes.

BACKGROUND

Virtual Private Networks (VPNs) are widely used to secure connections among computers (including computerized devices) and/or computer networks across unsecure networks. The unsecure networks may be public networks, private networks, or a combination of public and private networks. In order to securely communicate information across such unsecure networks, computers often establish connections and communicate by breaking up the information into a number of data packets and transmitting the data packets across the network, from a source to a destination. Once received at the destination, the information is restored by combining the received data packets in the appropriate order. The data packets are created using well-defined formats, also known as protocols, to ensure that the source and destination computers can successfully pack and unpack the information.

Internet Protocol (IP) is a standard protocol that is often used to send information across most private networks and the public Internet. The Internet community has standardized on two versions of the IP protocol, namely version 4 (IPv4) and IP version 6 (IPv6). Both versions, IPv4 and IPv6, require numerical addresses, indicating the network locations of the source and destinations computers, be placed in header sections of each data packet. Such numerical addresses are referred to as the source and destination addresses.

Internet Protocol Version 4, IPv4, requires allocating four bytes for each of the source and destination addresses, providing for up to $2^{32}$ unique addresses. However, this address size does not support the demand for the ultimate number of desired network addresses and efficient network routing. This address limitation is often addressed by creating two address categories, public addresses and private addresses. The private addresses are reserved for use within private networks and may be duplicated and used independently by any number of private networks.

In order to send a data packet from a computer with a private address to another computer across the public Internet, Network Address Translation (NAT) may be used to translate packets using private addresses to packets using public addresses. The address translation is often done at a computer that functions as a gateway between the public Internet and the private network.

SUMMARY

Certain embodiments disclosed herein relate to a method and corresponding system or computer implemented method for automatically avoiding address conflicts when establishing a secure communications link over a public network between a local computer, associated with a local network, and a remote computer, located outside the local network and associated with a remote network. In some embodiments, at least one processor is configured and arranged to (a) determine addresses reserved for use by the local network and addresses reserved for use by the remote network; (b) select at least one local address from a plurality of available local addresses, the selected local address being an address that does not conflict with the reserved addresses of the local network and the reserved addresses of the remote network; and (c) associate the selected local address in connection with establishment of the secure communications link between the local computer and the remote computer.

Some embodiments disclosed herein relate to a method and corresponding system or computer implemented method for establishing a virtual private network link over a public network between a first computer, associated with a first local network, and a second computer, associated with a second local network. In some embodiments, at least one processor is configured and arranged to automatically generate a new local network address for each of the first and second computers in conjunction with the establishment of the secure communications link when the local network addresses would otherwise conflict with other addresses in use on the respective local networks.

In some embodiments the at least one remote address may be selected from a plurality of available remote addresses such that the selected remote address is an address that does not conflict with the reserved addresses of the remote network. The selected local address and the selected remote address may be used in connection with establishment of the secure communications link. In certain embodiments, the selected local address may be an address that does not conflict with the selected remote address. In some embodiments, the selected remote address may be an address that does not conflict with the selected local address. In some embodiments, the selected remote address may be added to the reserved addresses of the local network and removed from the reserved addresses of the local network when the secure connection is disconnected. In some embodiments, the selected local address may be added to the reserved addresses of the remote network and removed from the reserved addresses of the remote network when the secure connection is disconnected.

Some embodiments disclosed herein relate to a method and corresponding system or computer implemented method for providing a domain name service for establishing a secure communications link so that secure communications can be provided over a public network between at least two computers, at least one of which is connected to a local network. In some embodiments, a domain name service system is configured to (a) be connected to a communications network; (b) indicate whether the domain name service supports establishing a secure communications link; (c) assign an address to each of the computers for use in establishing the secure communications link between the two computers; and (d) use a different address for each of the computers for use in establishing the secure communications link when the assigned address conflicts with addresses associated with the local network to which a computer is attached or with an address associated with a third computer on an existing secure communications link to which at least one of the first two computers is connected.

Certain embodiments disclosed herein relate to a method and corresponding system or computer implemented method for providing a domain name service for establishing a secure communications link so that secure communications can be provided over a public network between at least one computer connected to a local network and each of a plurality of computers connected to a second local network. In certain embodiments, a domain name service system is configured to (a) be connected to a communications network; (b) indicate whether the domain name service supports establishing a secure communications link; and (c) assign an address to each of the computers for use in establishing the secure communications link between the one computer and each of the plurality of computers so that each assigned address does not conflict with addresses already associated with the local network to which each computer is connected.

Certain embodiments disclosed herein relate to a method and corresponding system or computer implemented method for conducting communications between a local computer and a remote computer. In some embodiments, at the local computer, a plurality of addresses is selected for use in communicating with the remote computer. The selected addresses are addresses other than existing addresses currently in use by the local computer and devices attached thereto. An address of the selected plurality of addresses is verified against existing addresses currently in use by the remote computer and devices attached thereto and in an event the address is not being used by the remote computer, the address is used for conducting communications between the local computer and the remote computer.

In some embodiments, the selected local address may be used to address the local computer when establishing the secure communications link. In some embodiments, the selected local address may include an Internet Protocol (IP) address. In certain embodiments, the selected local address may include an IP address and network mask. The selected local address may be generated from a table configured to include the plurality of available local addresses. The selected local address may be randomly or pseudo-randomly generated.

In some embodiments, at least one remote address may be selected from a plurality of available remote addresses. The selected remote address may be an address that does not conflict with the reserved addresses of the remote network; and the selected local address and the selected remote address may be used in connection with establishment of the secure communications link.

Further, the selected local and remote addresses may be used to respectively address the local and remote computers when establishing the secure communications link. In some embodiments, the selected local and remote addresses may be both stored as a pair, and reused each time a secure communications link is established between the local and remote computers.

In some embodiments, the secure communications link may be a virtual private network (VPN) link. In certain embodiments, the secure communications link may be a host-to-host connection. In some embodiments, the secure communications link may be a host-to-network connection. In certain embodiments, the secure communications link may be a network-to-network connection.

In some embodiments, the plurality of available local addresses may be configured to include a sequence of unused local addresses and the selected local address may be generated according to the sequence of unused local addresses.

In some embodiments, the processor may be configured and arranged to associate each local address in connection with a session initiated protocol used to establish the secure communications link between the local computer and the remote computer. In some embodiments, the processor may be configured and arranged to generate the local address as a part of a session initiated protocol used to establish the secure communications link between the local computer and the remote computer.

In certain embodiments, the association of each generated local address and the establishment of the secure communications link may be in response to a request for a domain name. In certain embodiments, the association of each generated private address and the establishment of the secure communications link may be in response to a request for a secure domain name.

In certain embodiments, the remote computer may be associated with a second local network and may be allocated a second local address that does not conflict with local addresses already in use with the second local network. Both the local address allocated to the local computer and the second local network address allocated to the remote computer may be used to allow the routing of communications between the local and remote computers over the secure communications link.

In some embodiments, the processor may be configured and arranged to generate a plurality of local addresses for a corresponding number of local computers associated with the local network. In some embodiments, the processor may be configured and arranged to generate the plurality of local addresses as a part of a session initiated protocol associated with the establishment of the secure communications link between the remote computer and each of the corresponding local computers.

In certain embodiments, the secure communications link may be established in response to a request for an address corresponding to a domain name. In certain embodiments, the secure communications link may be established in response to a request for an address corresponding to a secure domain name.

In some embodiments, the domain name service may be configured to use a different address in establishing a secure communications link between the one computer and each of at least those computers of the plurality of computers where the assigned address for that computer conflicts with addresses already associated with the local network to which the computer is attached by using a different address for each of the computers of the plurality of computers for which a conflict exists.

In some embodiments, the domain name service may be configured to use a different address for any of the plurality of computers when the assigned address for any such computer conflicts with addresses already associated with the local network to which the computer is attached by reassigning different addresses for all of the plurality of computers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a table that includes examples of network driver address assignments that may be used with some embodiments disclosed herein.

FIG. 2B is a route table for the example address assignments shown in FIG. 2A.

FIG. 3A is a table that includes three example private address blocks and their corresponding network mask.

DETAILED DESCRIPTION

Figure 1:
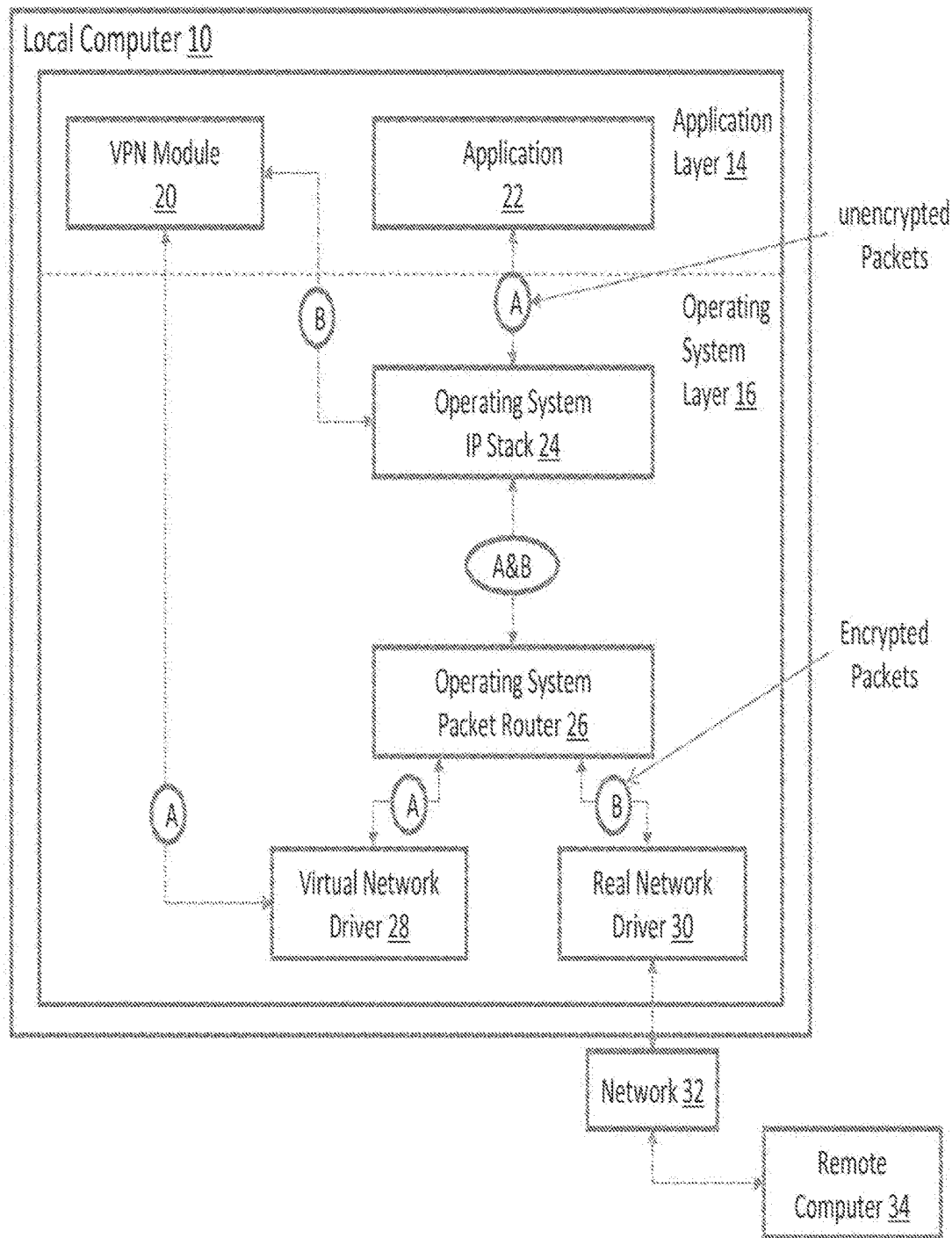
FIG. 1 is an illustration of a typical architecture used by many existing Virtual Private Networks in order to enable automatic routing.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Techniques for establishing secure communications, and their associated procedures, are described in U.S. patent application Ser. No. 10/702,522, filed on Nov. 7, 2003, now U.S. Pat. No. 6,839,759, U.S. patent application Ser. No. 10/714,849, filed on Nov. 18, 2003, now U.S. Pat. No. 7,418,504, U.S. patent application Ser. No. 13/285,962, filed on Oct. 31, 2011, and U.S. patent application Ser. No. 13/336,790, filed on Dec. 23, 2011, the teachings of which are incorporated herein by reference in their entirety.

Virtual Private Networks (VPNs) may be used to provide communications security by encrypting information data packets prior to transmitting the data across a network and decrypting the transmitted information at the destination source. Further, VPNs may encapsulate and encrypt private source and destination addresses to provide anonymity and allow private addressing to be used at each end so that the communicating computers on the respective source local network and destination local network may be uniquely identified.

Virtual Private Network packets usually utilize unencrypted VPN packet source and destination addresses that are typically externally visible addresses on the public network, and used by external network routers, to forward and ultimately deliver the packet to the intended destination computer.

Further, VPN networks use encapsulated private addresses to enable device-to-device VPN security. This provides for a device-level security that results in automatic routing of all IP packets destined to a computer at the far end of a VPN connection through the VPN, regardless of the computer application creating and using an IP socket.

Coordinating the allocation of non-conflicting private address blocks that can support numerous simultaneous VPN connections poses a significant challenge for network administrators since such coordination requires that network administrators at each VPN site agree on private address ranges consistent with their existing network configurations and non-conflicting with the other network sites. Further complicating this situation is that other computers may connect to different private networks utilizing the same private address, making packet addressing ambiguous. Accordingly, a more transparent, automated private address allocation approach is desirable.

VPNs often use IP addressing to enable computers on the VPN to route packets within encrypted tunnels from one computer on the VPN to another computer on the VPN. These secure IP addresses must be allocated and assigned to the participating computers before or at the time the VPN connection is established. Address allocation must be done to avoid routing conflicts with existing or reserved network addresses. The address allocation may be performed during setup of a VPN server device, by selecting a private address block, which is known or, at least, is not expected to conflict with participating computer addresses. This can be done with a fair degree of confidence for semi-static applications, such as an enterprise VPN server for employee's travel computers.

However, in a more dynamic scenario, where computers are setting up and tearing down VPN connections to multiple computers and/or computer networks, prior selection and management of non-conflicting secure IP addresses becomes difficult. As the number of participating computers and simultaneous connections increases, this selection and management problem increases geometrically. The present invention offers a unique and effective approach to solving this problem without requiring a geometrically increasing computation.

FIG. 1 illustrates an architecture that may be used to enable automatic routing. As illustrated in FIG. 1, a VPN is implemented by creating a virtual network device driver. As shown in FIG. 1, the local computer 10 is configured to run a program, including an application layer 14 and an operating system layer 16. The application layer 14 includes a VPN module 20 and one or more applications 22 used to create data packets for being transmitted over the VPN. The operating system layer 16 includes an operating system IP stack 24 that is configured to arrange the data generated by application 22.

An operating system packet router 26 assembles and encrypts the data (unencrypted data packets A), through the virtual network driver 28, according to a protocol (not shown) established by the VPN module 20. The encrypted data packets (data packets B) are transmitted, by a real network driver 30, over a VPN connection, through the network 32, to a remote computer 34.

For example, as shown in FIG. 1, in certain embodiments, unencrypted data packets, A, are transmitted by the VPN module 20, application 22, operating system IP stack 24, operating system packet router 26, and virtual network driver 28. The transmitted unencrypted data packets A are encrypted between the operating system packet router 26 and the real network driver 30 to form encrypted data packets B. The encrypted data packets B are transmitted by the real network driver 30 through the network 32 to the remote computer 34. Both unencrypted and encrypted data packets A&B are transmitted between the operating system IP stack 24 and the operating system packet router 26.

The output of real network driver 30 includes a private address and a routing address block (not shown). The routing address block includes destination addresses associated with the VPN.

In certain embodiments, unencrypted private network packets A, originating, for example, from a network socket code of an application 22, are routed to a virtual network driver 28. The virtual network driver 28 forwards these packets to the VPN module 20. The VPN module 20 encrypts these packets A and creates encrypted packets B having public addresses. The encrypted packets B are routed via the operating system packet router 26 to the real network driver 30 for transmission across the network 32.

Incoming encrypted packets (not shown), arriving from a remote computer 34, are routed up to the VPN module 20, via the real network driver 30, for decryption and, once decrypted, are ultimately routed up to the application 22.

The operating system packet router 26 makes appropriate routing decisions based upon a destination address found in the packet A, B coming from the operating system IP Stack 24. The destination address may be matched against a route table. The route table may be based upon network parameters specified for each network device.

In certain embodiments, multiple simultaneous VPNs may be supported by configuring the VPN module 20 to associate different private destination addresses with different public destination addresses and corresponding encryption keys.

Coordinating the allocation of private address blocks such that the allocated addresses are non-conflicting to support numerous simultaneous VPN connections, is a significant challenge for network administrators. This requires that network administrators at each VPN site agree upon private address ranges consistent with their existing network configurations and non-conflicting with the other network sites.

FIG. 2A is a table that includes examples of network driver address assignments that may be used with some embodiments disclosed herein. In the example shown in FIG. 2A, an IP address block, namely 192.168.0.0, commonly used by small networks, is used to establish communications. For example, the real network driver 30 (shown FIG. 1) uses an IP address of 192.168.0.21, the gateway (not shown) of the real network driver 30 uses an IP address of 192.168.0.1, and the virtual network driver 28 (shown FIG. 1) uses an IP address of 192.168.3.23. Network mask 255.255.255.0 is the network mask commonly used with the 192.168.0.0 block.

Routing conflicts may occur if a computer requests to use this address block (i.e., 192.168.0.0) to establish a VPN connection with two or more other computers. Routing may become further complicated if other computers, connected to other private networks, utilize the same private address block (i.e., 192.168.0.0).

FIG. 2B is a route table for the example address assignments shown in FIG. 2A. As shown in FIG. 2B, packets with addresses ranging from 192.168.3.0 to 192.168.3.255 are routed to the virtual network driver 28 and packets with addresses ranging from 192.168.0.0 to 192.168.0.255 are routed to the real network driver 30. All other packets are sent to the local gateway computer at 192.168.0.1 via the real network driver 30.

Based on the address ranges shown in FIG. 2B, in order to avoid addressing conflicts, the private VPN addresses that may be used by the remote computer 34 need to range from 192.168.3.0 to 192.168.3.254, excluding 192.168.3.23. Accordingly, a conflict may occur, if the virtual network driver addresses at the remote computer 34 do not correspond to the address block 192.168.3.*. Additionally, a conflict may occur if the remote computer is using the IP address 192.168.3.23 or is in an existing VPN that uses the IP address 192.168.3.23. The likelihood of such conflict increases, as the number of participating computers increases.

Certain embodiments disclosed herein prevent addressing conflicts by allocating a block of private addresses, available to a local computer, that do not conflict with local private address blocks of the local computer for use in generating possible private addresses for use by the virtual network driver 28. For example, in some embodiments, the largest block of private addresses, available to the local computer, that do not conflict with local private address blocks of the local computer may be allocated. An IP address is selected (e.g., randomly) from the allocated address block and the selected IP address and its corresponding network mask are associated with the virtual network driver 28.

In some embodiments, during a VPN setup negotiation between the local computer 10 and the remote computer 34, the selected address and network mask may be used to propose possible private addresses. For example, the remote computer 34, having a set of similarly generated addresses and their corresponding network masks, may select a compatible pair of address/network mask that allows both ends (i.e., local computer 10 and remote computer 34) to route the private addresses via each respective virtual network driver 28 without any conflict.

FIG. 3A is a table that includes three example private address blocks and their corresponding network mask.

Typically, each IP address includes four octets and every octet in the IP address is represented by 8 bits. For example, in IP address 192.168.0.0, octet 1 is set to 192, octet 2 is set to 168, octet 3 is set to 0, and octet 4 is also set to 0.

Each octet value is a decimal number that represents a binary value and every binary value may include 8 bits each of which may be set to 0 or 1. If a bit is set to 1 that bit is considered active and if it is set to zero that bit is considered as not being active. In the above example, the value 192 of octet 1 may be calculated using the following 8 numbers: 128, 64, 32, 16, 8, 4, 2, 1 and the binary value 11000000. Since binary value 1100000 sets only the first two bits as active, only the first two values of the 8 values used to define the first octet are used to calculate the octet value, giving the octet the value of 128+64=192.

To accommodate different network sizes, IP address spaces are divided into three sections, namely, Class A which covers IP addresses ranging from (0.x.x.x) to (126.x.x.x), Class B which covers IP addresses ranging from (128.x.x.x) to (191.x.x.x), and Class C which covers IP addresses ranging from (192.x.x.x) to (253.255.255.255).

As shown in FIG. 3A, private network address blocks 192.168.0.0, 172.16.0.0, and 10.0.0.0, having network masks 255.255.0.0, 255.240.0.0, and 255.0.0.0, respectively, are often used by private networks.

Figure 3B:
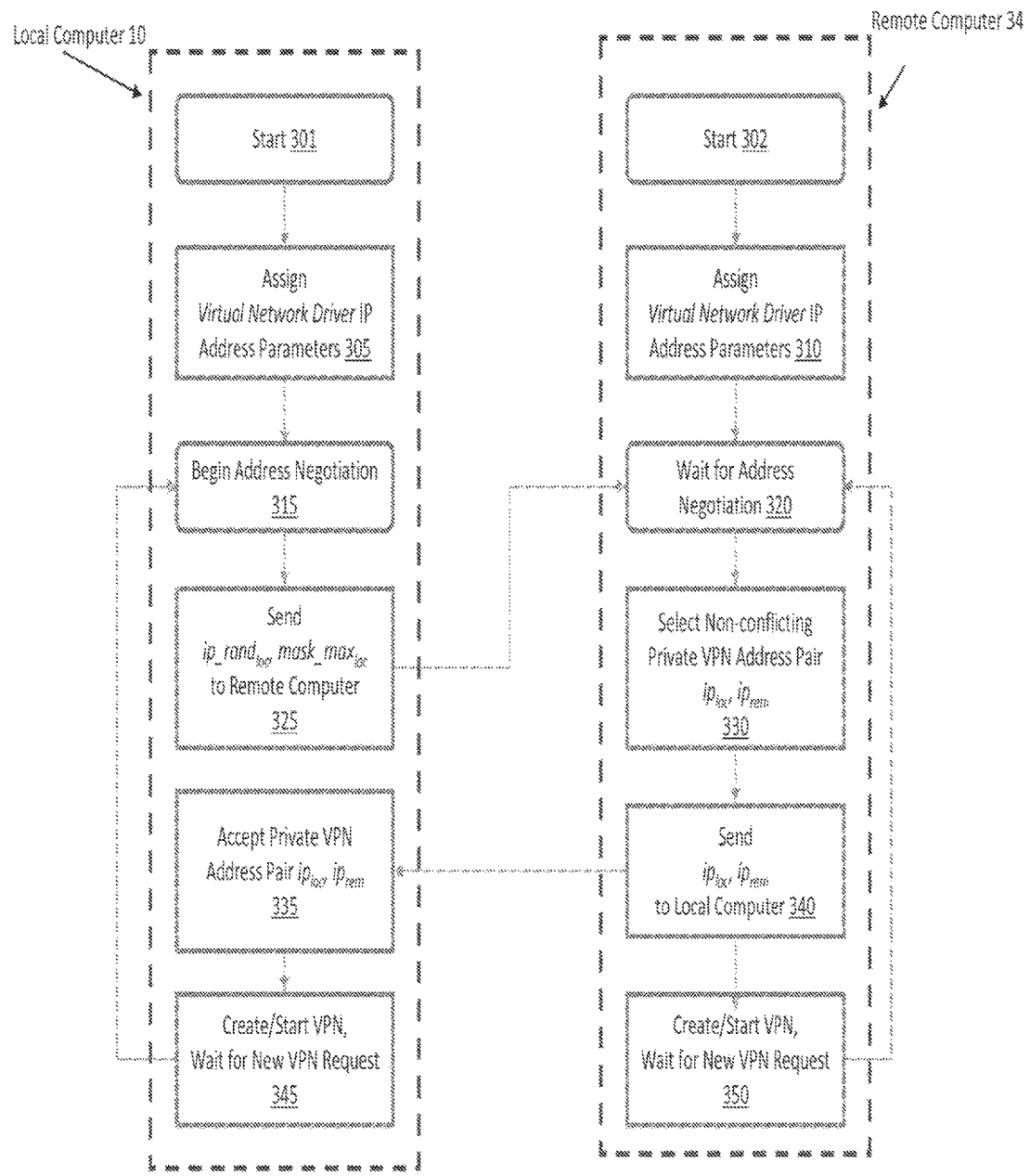
FIG. 3B is a flow diagram of procedures for negotiating private VPN address pairs using the private address blocks shown in FIG. 3A and according to certain embodiments disclosed herein.

FIG. 3B is a flow diagram of procedures for negotiating private VPN address pairs according to certain embodiments disclosed herein. In some embodiments, private address pairs may be selected from the private address blocks shown in FIG. 3A.

As shown in FIG. 3B, private VPN address pair negotiation may begin 305, at the local computer 10 end, by allocating a block of private addresses that are available to a local computer 10 and do not conflict with existing private address blocks of the local computer 10. Once allocated, the private address block is used to generate a number of private addresses that are assigned 305 to the virtual network driver 28 (shown in FIG. 1) of the local computer 10. Similarly, at a remote computer side 34, a block of private addresses that are available to the remote computer 34 and that do not conflict with existing private address blocks of the remote computer 34 are allocated and used to generate a number of private addresses that are assigned 310 to the virtual network driver (not shown) of the remote computer 34.

In certain embodiments, the private address assigned to the virtual network driver may be generated randomly from a range of allocated addresses. In certain embodiments, the private address assigned to the virtual network driver may be generated in a pseudorandom manner. In some embodiments, the private address assigned to the virtual network driver may be selected from a list of available private addresses. For example, in some embodiments, the allocated addresses may be arranged sequentially and a numbering service (not shown) may select the first address in the sequence and assign the selected address to the virtual network driver. The local computer 10 and the remote computer 34 may use similar or different selection schemes for selecting an address for assignment to their respective virtual network drivers.

Address negotiation begins 315 on the local computer 10 side by forwarding 325 the non-conflicting addresses ip_rand$_{loc}$ of the local computer and their corresponding network masks, mask_max$_{loc}$ to the remote computer 34. As noted above, the non-conflicting addresses may be selected from among the addresses in the allocated block using various selection methods known in the art. For example, in certain embodiments, the non-conflicting addresses are generated randomly.

On the remote computer 34 side, the remote computer awaits the initiation of the address negotiation procedures 320. Address negotiation begins once the addresses forwarded by the local computer 10 are received by the remote computer 34. Once the addresses are received, the remote host 34 checks the received addresses to determine if any of the addresses conflict with addresses already in use by the remote host 34, and selects 330 a non-conflicting address pair ip$_{loc}$ and ip$_{rem}$ from among addresses that do not conflict with its existing addresses.

The remote computer 34 forwards 340 the selected address pair ip$_{loc}$ and ip$_{rem}$ to the local computer 10. The local computer 10 accepts 335 the address pair forwarded by the remote computer 34 and uses the address pair to create and initiate a VPN session 345. The remote computer 34 also uses the selected address pair to create and initiate a new VPN session 350.

Figure 4:
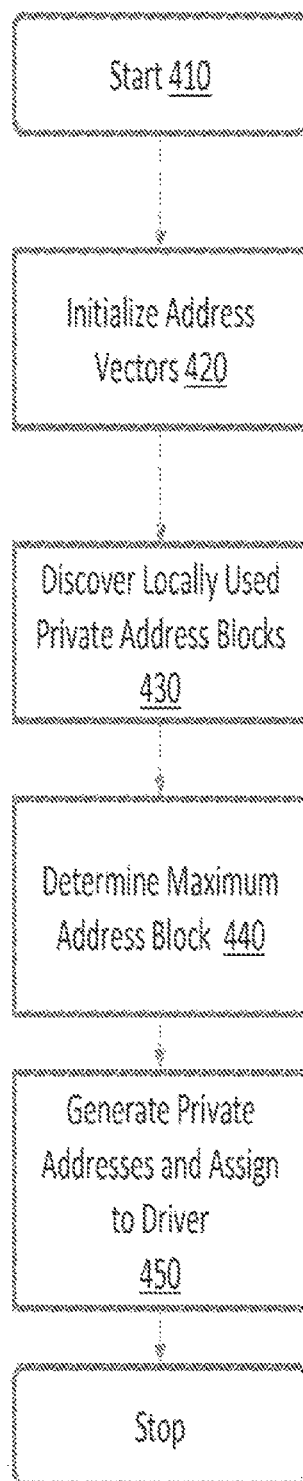
FIG. 4 is a flow diagram for assigning virtual network driver IP address parameters according to certain embodiments disclosed herein.

FIG. 4 is a flow diagram for assigning virtual network driver IP address parameters according to certain embodiments disclosed herein. The procedures for assigning virtual network driver IP address parameters start 410 by initializing 420 one or more address vector pairs for use with the embodiments described herein. The address vector pairs may include one or more block of private addresses, and their corresponding network masks. For example, in certain embodiments, the address block pairs may be used to initialize the address vector pairs such that:

$$IP_{allocated} = \{IP\ Block_0, IP\ Block_1, \ldots, IP\ Block_k\}$$

$$Mask_{allocated} = \{Mask\ Block_0, Mask\ Block_1, \ldots, Mask\ Block_k\}.$$

For example, in certain embodiments, the address block pairs shown in FIG. 3A may be used to initialize the address vector pairs such that:

$$IP_{allocated} = \{191.168.0.0, 172.16.0.0, 10.0.0.0\}$$

$$Mask_{allocated} = \{255.255.0.0, 255.240.0.0, 255.0.0.0\}.$$

Once the address blocks are initialized 420, the computer (e.g., local computer 10 and/or remote computer 34) determines if any addresses within the initialized address vectors are conflicting addresses. Specifically, in some embodiments, the computer may determine all of locally used private address blocks 430 and reserve the already used private address blocks for local use by the computer. In certain embodiments, the computer may maintain a vector of reserved address blocks and their associated network masks. For example:

$$IP_{reserved} = \{IP_{reserved\_0}, IP_{reserved\_1}, \ldots, IP_{reserved\_k-1}\}$$

$$Mask_{reserved} = \{Mask_{reserved\_0}, Mask_{reserved\_1}, \ldots, Mask_{reserved\_k-1}\}.$$

A maximum address block size that may be used in address negotiation may be determined 440 by finding the largest block of addresses, from among the addresses in the initialized address vectors, that does not include any of conflicting addresses with those already in use by the computer. Specifically, addresses are selected from among the addresses included in each of the initialized address blocks while ensuring that the selected addresses do not overlap with addresses included in the vector of reserved addresses. Specifically, addresses are selected such that the selected addresses ($IP_{selected}$) satisfy the following format:

$$(IP_{selected} \subset IP_{allocated})\ \text{and}\ (IP_{selected} \not\subset IP_{reserved})$$

For example, assuming that k=0, 1, . . . , n, for each k, where n is a finite number, the maximum address block size for IP address and network mask fields, $IP_{selected\_MAX\_k}$ and $Mask_{selected\_MAX\_k}$, respectively, may be determined such that:

$$IP_{selected\_MAX\_k} = (IP_{selected\_k} \subset IP_{allocated\_k}) \text{ and } (IP_{selected\_k} \not\subset IP_{reserved\_k})$$

$$Mask_{selected\_MAX\_k} = (Mask_{selected\_k} \subset Mask_{allocated\_k}) \text{ and } (Mask_{selected\_k} \not\subset Mask_{reserved\_k}).$$

Accordingly, $Mask_{selected\_k}$ is a subset of $Mask_{allocated\_k}$ and not over-lapping $Mask_{reserved\_k}$ blocks. Similarly, $IP_{selected\_k}$ is a subset of $IP_{allocated\_k}$ and not over-lapping $IP_{reserved\_k}$ blocks.

A number of addresses (e.g., private addresses) are selected from the maximum address block and assigned to the virtual network drivers of the local and remote computers 450. In certain embodiments, the addresses may be selected randomly. In some embodiments, the addresses may be selected pseudorandomly. Other selections schemes known in the art may also be used.

For example, in some embodiments, assuming that k=0, 1, . . . , n, for each k, where n is a finite number, addresses may be selected (e.g., randomly) according to the following format:

$$\{IP_{selected\_k} \& Mask_{selected\_k}\} = (IP_{selected\_MAX\_k} \& Mask_{selected\_MAX\_k}) | rand | \sim (IP_{selected\_MAX\_k} \& Mask_{selected\_MAX\_k}),$$

where rand is a randomly generated 32 bit value, & is a bitwise AND operator, | is a bitwise OR operator, and ~ is a bitwise NOT operator. The generated $\{IP_{selected\_k} \& Mask_{selected\_k}\}$ address blocks are assigned to the virtual network driver.

Figure 5:
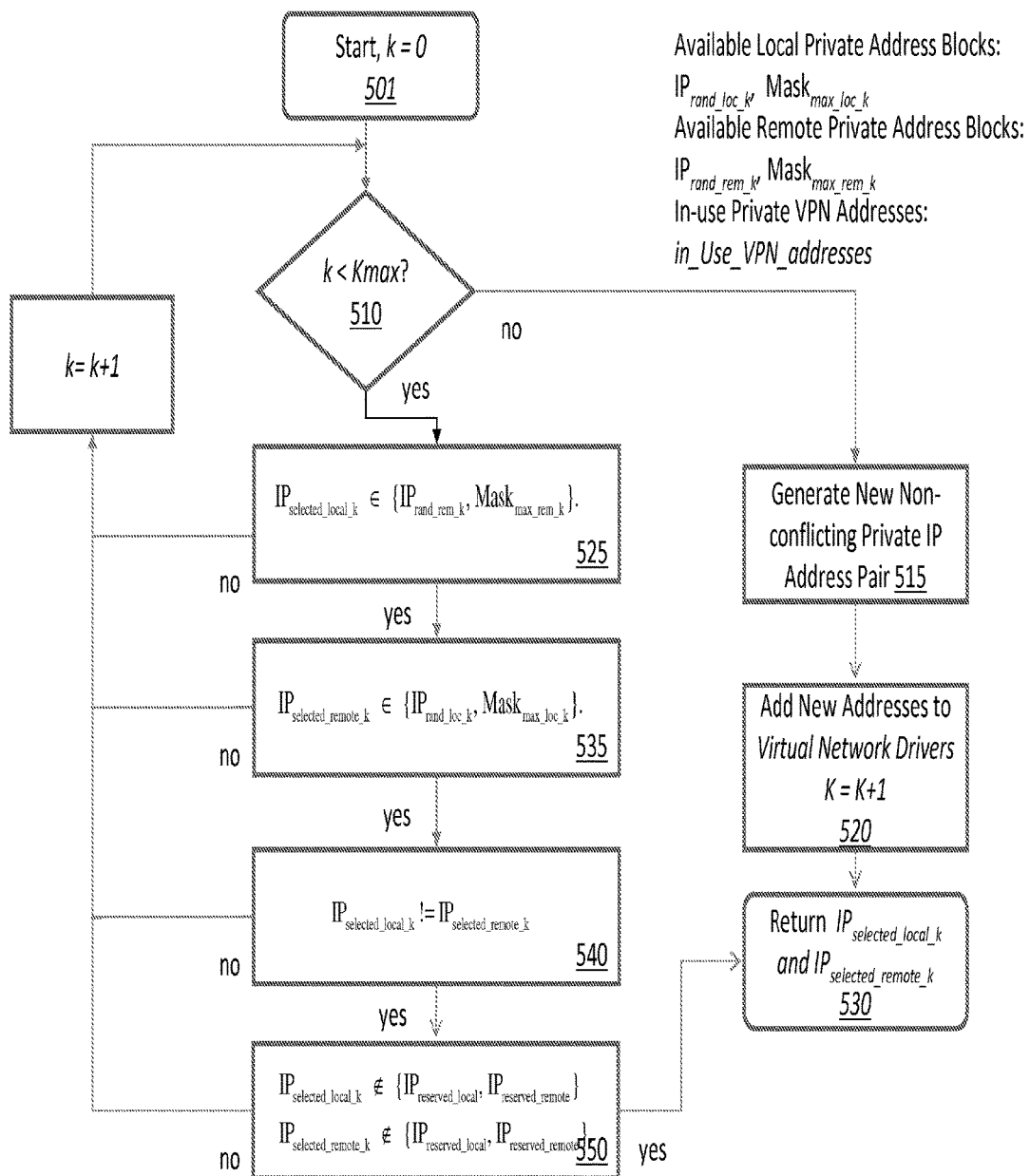
FIG. 5 is a flow diagram for selecting non-conflicting private VPN address pairs according to certain embodiments disclosed herein.

FIG. 5 is a flow diagram for selecting non-conflicting private VPN address pairs according to certain embodiments disclosed herein. In some embodiments, address negotiation may begin by initializing an index value k, for example, by setting its value to zero (i.e., k=0) 501. The value of k is checked against a maximum address block size, $k_{max}$, 510.

If k≥$k_{max}$, a new non-conflicting private address pair is generated 515. The generated non-conflicting private address pair is assigned 520 to the virtual network driver of the local computer 10 (denoted by $IP_{selected\_local\_k}$) and also to the virtual network driver of the remote computer 34 (denoted by $IP_{selected\_remote\_k}$). The generated addresses, namely $IP_{selected\_local\_k}$ and $IP_{selected\_remote\_k}$, are assigned as non-conflicting addresses that may be used to establish communications between the local computer and the remote computer 530.

If k≤$k_{max}$, the address negotiation procedures described herein determine whether the k-th selected IP address block of the local computer, namely $IP_{selected\_local\_k}$, is within the set of available addresses of the remote computer (e.g., if the address is being used by the remote computer or a device associated with the remote computer, it is not available) 525. Specifically, the address negotiation procedures determine whether $$IP_{selected\_local\_k} \in \{IP_{rand\_rem\_k}, Mask_{max\_rem}\},$$

Where $\{IP_{rand\_rem\_k}, Mask_{max\_rem\_k}\}$ is the kth block of available remote computer addresses.

If the k-th selected IP address block of the local computer, $IP_{selected\_local\_k}$, is determined as not being within the set of available addresses of the remote computer, the value of index k is reset, for example, by setting k=k+1, and once again checked against the maximum address block size $k_{max}$ 510. Once the value of index k is reset, the procedures proceed to verify possible conflicts for the next address in the address block, namely the k-th+1 address block.

However, in an event it is determined that the k-th selected IP address block of the local computer is contained in the set of available addresses of the remote computer, the address negotiation procedures described herein proceed by determining whether the k-th selected IP address block of the remote computer, namely $IP_{selected\_remote\_k}$, is within the set of available addresses of the local computer (e.g., if the address is being used by the local computer or a device associated with the local computer, it is not available) 535. Specifically, the address negotiation procedures determine whether $$IP_{selected\_remote\_k} \in \{IP_{rand\_loc\_k}, Mask_{max\_loc\_k}\},$$

Where $\{IP_{rand\_loc\_k}, Mask_{max\_loc\_k}\}$ is the kth block of available local computer addresses.

If the k-th selected IP address block of the remote computer, $IP_{selected\_remote\_k}$, is determined as not being within the set of available addresses of the local computer, the value of index k is reset, for example, by setting k=k+1, and once again checked against the maximum address block size $k_{max}$ 510. Once the value of index k is reset, the procedures proceed to verify possible conflicts for the next address in the address block, namely the k-th+1 address block.

However, in an event it is determined that the k-th selected IP address block of the remote computer is contained in the set of available addresses of the local computer, the address negotiation procedures described herein proceed by determining whether the k-th selected IP address block of the local computer, namely $IP_{selected\_local\_k}$, is the same address as the k-th selected IP address block of the remote computer, namely $IP_{selected\_remote\_k}$ 540. Specifically, in some embodiments, the procedures may determine whether:

$$IP_{selected\_local\_k}! = IP_{selected\_remote\_k},$$

where operator ! is a logical "not" operator.

If the k-th selected IP address block of the local computer, $IP_{selected\_local\_k}$, is determined to be the same address as the k-th selected IP address block of the remote computer, namely $IP_{selected\_remote\_k}$ (i.e., $IP_{selected\_local\_k}! = IP_{selected\_remote\_k}$ is false), the value of index k is reset, for example, by setting k=k+1, and once again checked against the maximum address block size $k_{max}$ 510. Once the value of index k is reset, the procedures proceed to verify possible conflicts for the next address in the address block, namely the k-th+1 address block.

However, if the k-th selected IP address block of the local computer, $IP_{selected\_local\_k}$, is determined not to be the same address as the k-th selected IP address block of the remote computer, namely $IP_{selected\_remote\_k}$ (i.e., $IP_{selected\_local\_k}! = IP_{selected\_remote\_k}$ is true), the address negotiation procedures described herein proceed by determining whether the k-th selected IP address block of the local computer, namely $IP_{selected\_local\_k}$, belongs to a set defined by all reserved addresses of the local computer (i.e., addresses being used by the local computer or a device associated with the local computer) and all reserved addresses of the remote computer (i.e., addresses being used by the remote computer or a device associated with the remote computer) 550 Additionally, the address negotiation procedures described herein proceed by determining whether the k-th selected IP address block of the remote computer, namely $IP_{selected\_remote\_k}$, belongs to a set defined by all reserved addresses of the local computer (i.e., addresses being used by the local computer or a device associated with the local computer) and all reserved addresses of the remote computer (i.e., addresses being used by the remote computer or a device associated with the remote computer). Specifically, the procedures determine whether $$IP_{selected\_local\_k} \notin \{IP_{reserved\_local}, IP_{reserved\_remote}\}$$

and $$IP_{selected\_local\_k} \notin \{IP_{reserved\_local}, IP_{reserved\_remote}\}.$$

If the k-th selected IP address block of the local computer, $IP_{selected\_local\_k}$, is determined to belong to the set defined by reserved VPN addresses (i.e., the set, $\{IP_{reserved\_local}, IP_{reserved\_remote}\}$, defined by all reserved addresses of the local computer and all reserved addresses of the remote computer), namely if it $IP_{selected\_local\_k} \notin \{IP_{reserved\_local}, IP_{reserved\_remote}\}$ is determined to be false or the k-th selected IP address block of the remote computer, $IP_{selected\_remote\_k}$, is determined to belong to the set defined by reserved VPN addresses (i.e., the set, $\{IP_{reserved\_local}, IP_{reserved\_remote}\}$, defined by all reserved addresses of the local computer and all reserved addresses of the remote computer), namely if it $IP_{selected\_remote\_k} \notin \{IP_{reserved\_local}, IP_{reserved\_remote}\}$ is determined to be false, the value of index k is reset, for example, by setting k=k+1, and once again checked against the maximum address block size $k_{max}$ 510. Once the value of index k is reset, the procedures proceed to verify possible conflicts for the next address in the address block, namely the k-th+1 address block.

However, if the k-th selected IP address block of the local computer, $IP_{selected\_local\_k}$, is determined not to belong to the set defined by reserved VPN addresses (i.e., if it $IP_{selected\_local\_k} \notin \{IP_{reserved\_local}, IP_{reserved\_remote}\}$ is determined to be true) and the k-th selected IP address block of the remote computer, $IP_{selected\_remote\_k}$, is determined not to belong to the set defined by reserved VPN addresses (i.e., if it $IP_{selected\_remote\_k} \notin \{IP_{reserved\_local}, IP_{reserved\_remote}\}$ is determined to be true), the address negotiation procedures described herein proceed by assigning $IP_{selected\_local\_k}$ and $IP_{selected\_remote\_k}$ as non-conflicting addresses that may be used to establish communications between the local computer and the remote computer 530.

Figure 6A:
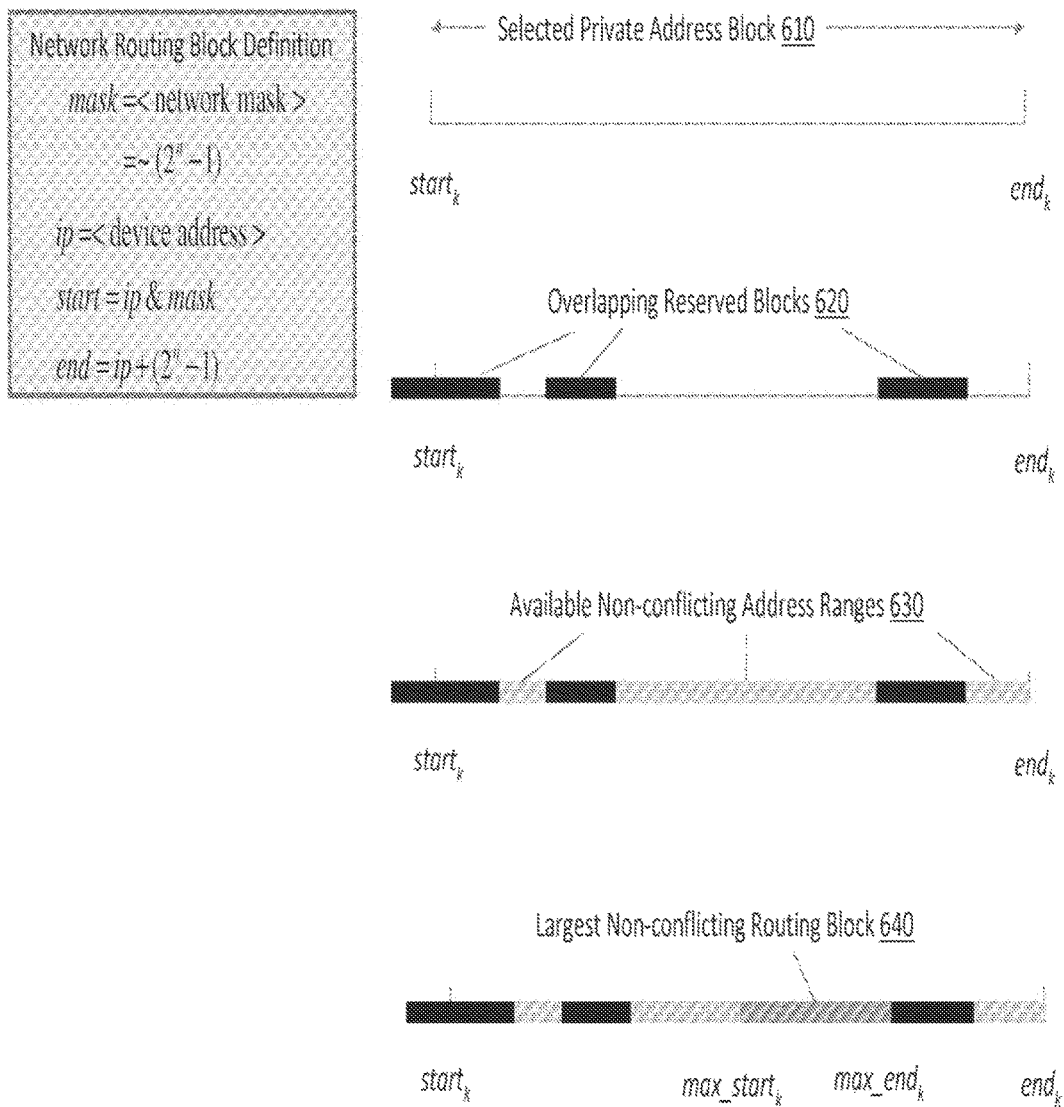
FIG. 6A is a diagram for determining a maximum address block size that may be used in address negotiation according to certain embodiments disclosed herein.

FIG. 6A is a flow diagram for determining a maximum address block size that may be used in address negotiation according to certain embodiments disclosed herein. As explained previously, a block of addresses, having a starting address, $start_k$, and an ending address, $end_k$, may be allocated for use in establishing a VPN connection 610. For example, in certain embodiments, address blocks 192.168.0.0 or 255.255.0.0 may be allocated. The allocated block of addresses may include a number of overlapping addresses currently in use by the computer (e.g., local computer 10 or remote computer 34) and its associated devices. These overlapping addresses are identified 620. The remaining addresses (i.e., non-conflicting addresses are also identified 630. The largest block of non-conflicting addresses may be identified 640 from among the identified non-conflicting IP addresses. The identified largest block may be selected as the largest block. In some embodiments, a portion of the identified largest block may be selected, provided that the selected portion is larger than other non-conflicting blocks. In some embodiments, selecting an address block may be done by limiting address blocks which can be defined by an IP address and a corresponding routing network mask. Such a network mask is generally of the form mask=~$(2^n-1)$, where $2 \leq n \leq 32$, where the ~ operator is the ones-complement over a 32 bit integer. In this case start=ip & mask and end=start+$(2^n-1)$. With this formulation, any and all IP addresses (addr) within this block will satisfy addr & mask=ip & mask.

Figure 6B:
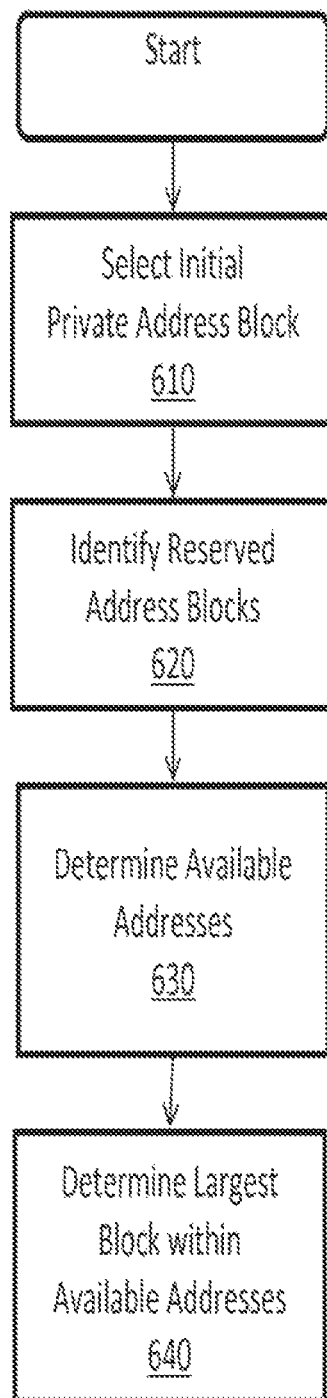
FIG. 6B is a flow diagram for determining a maximum address block size that may be used in address negotiation according to certain embodiments disclosed herein.

FIG. 6B is a flow diagram for determining a maximum address block size that may be used in address negotiation according to certain embodiments disclosed herein. As explained previously, in order to determine the maximum address block size, an initial private address block is first selected 610. Reserved address blocks, which includes addresses already in use by the computer (e.g., local computer 10 or remote computer 34) and its associated devices are also determined. Available address blocks are then identified by determining blocks of the initially selected private addresses that are not already occupied by the reserved address blocks. In certain embodiments, the available address blocks may be determined by obtaining an intersection of the initial address block and the reserved address block and subtracting the set resulting from the intersection from the initial set of address blocks. Specifically:

Available IP addresses=Initial IP Addresses−(Initial IP Addresses∩Reserved IP Addresses), where ∩ is a set intersection operator.

The largest address block may be obtained by comparing the IP address blocks in the available IP address blocks against each other and selecting the largest block 640.

Figure 7:
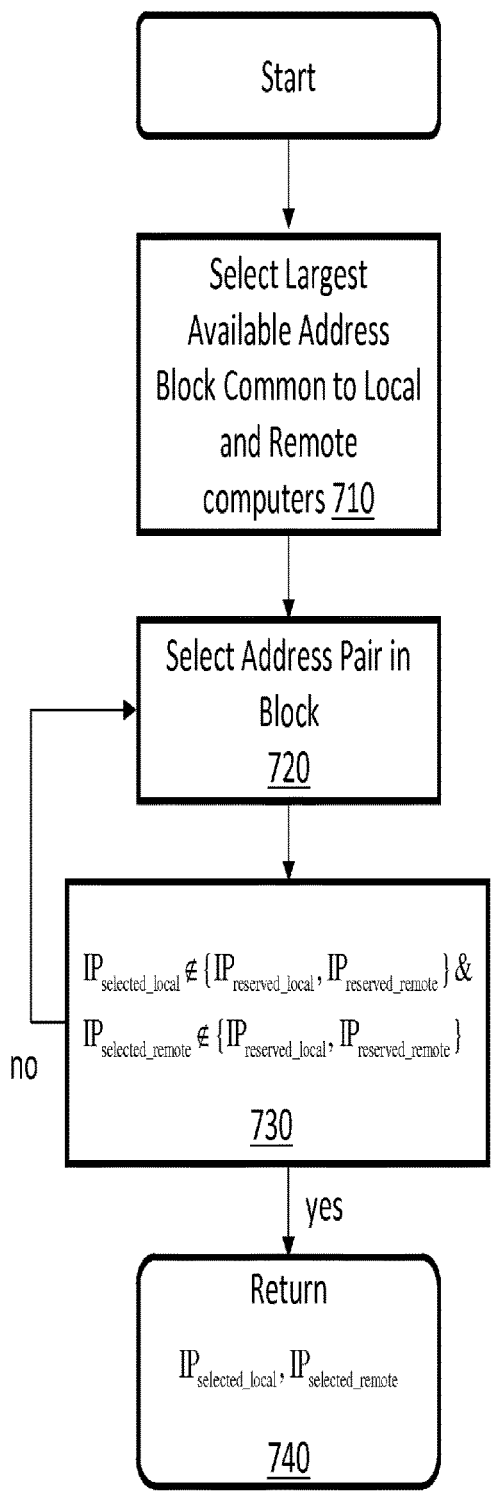
FIG. 7 is a flow diagram for generating a non-conflicting private address pair according to certain embodiments disclosed herein.

FIG. 7 is a flow diagram for generating a non-conflicting private address pair according to certain embodiments disclosed herein. In order to determine an address pair that is non-conflicting for both the local computer 10 (FIG. 1) and the remote computer 34 (FIG. 1), certain embodiments disclosed herein may determine the largest private address block that is common between the local 10 and remote 34 computers 710. An address pair may be selected from among the addresses included in the common address block 720. In certain embodiments, the address pair may be selected randomly from among the addresses included in the common address block. In certain embodiments, the address pair may be selected pseudorandomly from among the addresses included in the common address block. In some embodiments, the selected address may be selected sequentially from a list of addresses included in the common address block. Other selection schemes known in the art may be used.

Once the address pair is selected from among the addresses included in the common address block, the selected pair of addresses are checked against the addresses already in use by the virtual private network to determine if they are already in use (i.e., if they are reserved addresses) 730. For example, the addresses may be verified as follows:

$$IP_{selected\_local} \notin \{IP_{reserved\_local}, IP_{reserved\_remote}\} \ \& \ IP_{selected\_remote} \notin \{IP_{reserved\_local}, IP_{reserved\_remote}\},$$

where $IP_{selected\_local}$ denotes the address selected for the local computer, $IP_{selected\_remote}$ denotes the address selected for the remote computer, $IP_{reserved\_local}$ denotes the addresses reserved by the local computer, $IP_{reserved\_remote}$ denotes the addresses reserved by the remote computer, and & is a logical "and" operator.

If the selected address pair is deemed as belonging to the reserved addresses of the local 10 and remote 34 computers (i.e., if $IP_{selected\_local} \notin \{IP_{reserved\_local}, IP_{reserved\_remote}\} \ \& \ IP_{selected\_remote} \notin \{IP_{reserved\_local}, IP_{reserved\_remote}\}$ is false), another address from among the addresses included in the common address block is selected.

If the selected address pair is deemed as not belonging to the reserved addresses of the local 10 and remote 34 computers (i.e., if $IP_{selected\_local} \notin \{IP_{reserved\_local}, IP_{reserved\_remote}\}$ & $IP_{selected\_remote} \notin \{IP_{reserved\_local}, IP_{reserved\_remote}\}$ is true), the values of the selected address pair, $IP_{selected\_local}$, $IP_{selected\_remote}$, is used for assignment to the virtual network driver 740.

Figure 8:
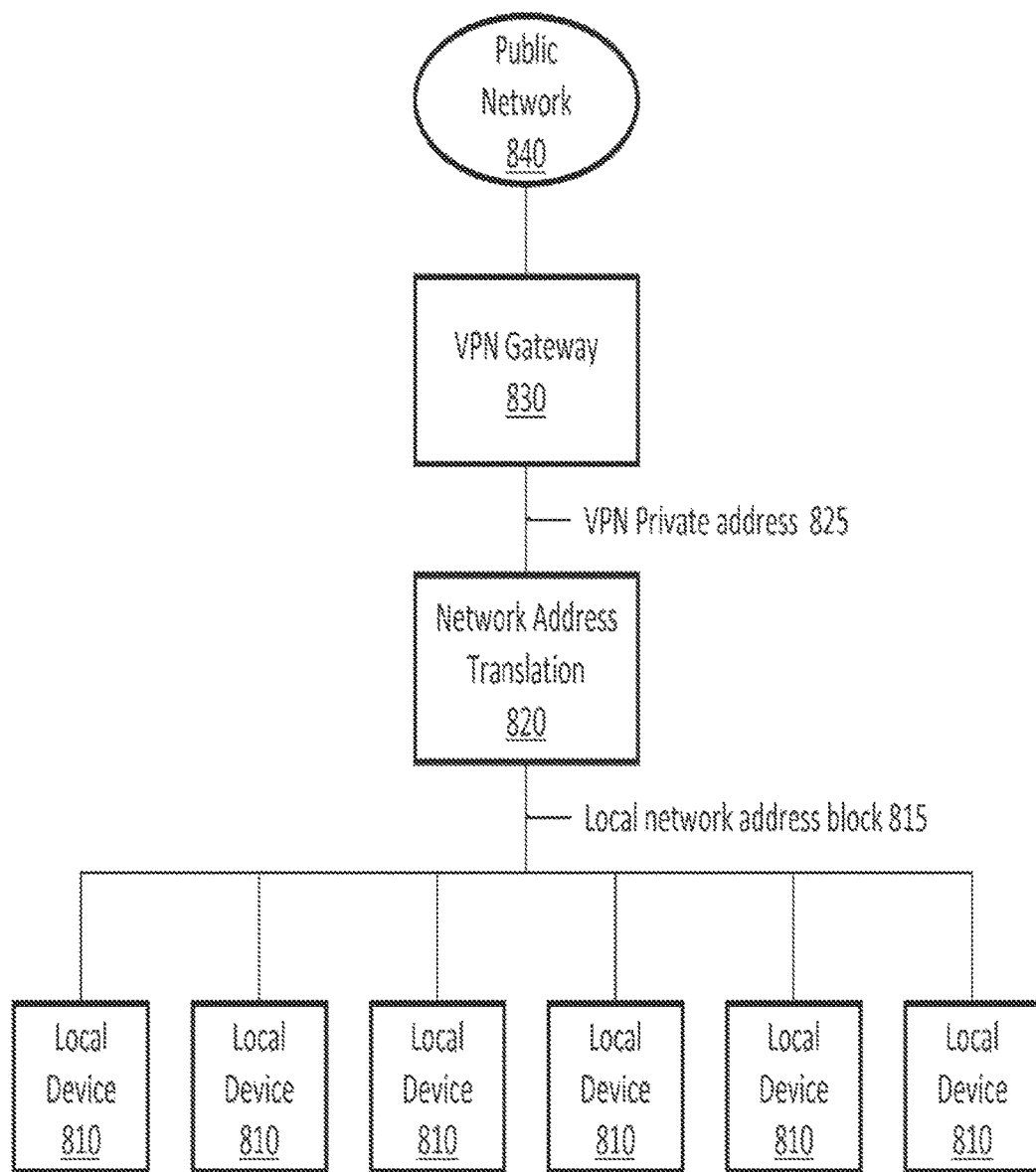
FIG. 8 is a block diagram of a virtual private network that uses a network address translation device.

FIG. 8 is a block diagram of a system that uses a network address translation device for connecting local devices 810 of a private network to a public network 840. The devices 810 of the private network may use a local network address block 815 for maintaining connectivity within the private network. The devices 810 connect to the public network (e.g., the internet) 840 through a network address translation (NAT) device 820 and a VPN gateway 830.

The NAT 820 translates the local network addresses of the local address block 815 used by the local devices 810 into corresponding private IP addresses 825 that may be used by the VPN gateway 830 for establishing connection through a public network 840.

The VPN gateway 830 employs the private addresses 825 for maintaining communications between the local devices 810 through the VPN tunnel to remote devices. The VPN gateway 830 may further employ a static or dynamically assigned public IP address to connect to the public network 840.

Figure 9A:
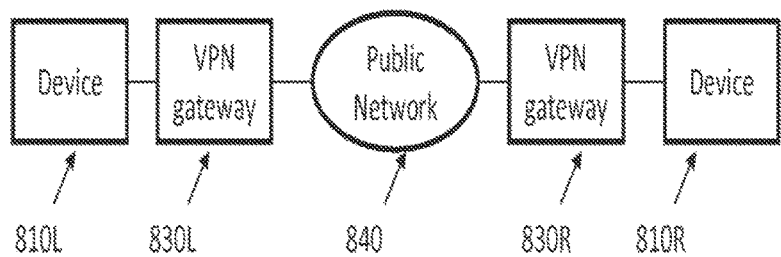
FIG. 9A illustrates a network in which devices of a local computer communicate with devices of a remote computer via a virtual private network.
Figure 9B:
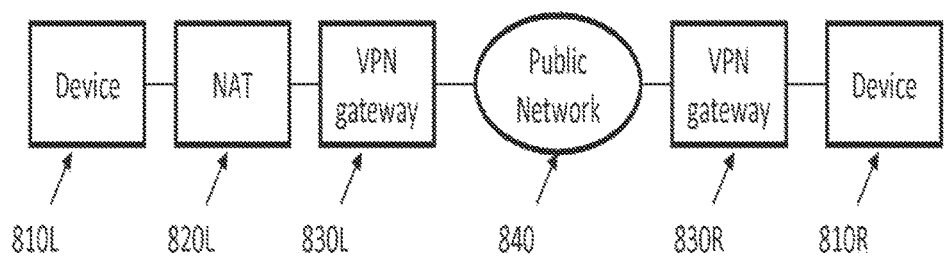
FIG. 9B illustrates a network architecture in which the local computer uses a network address translator device.
Figure 9C:
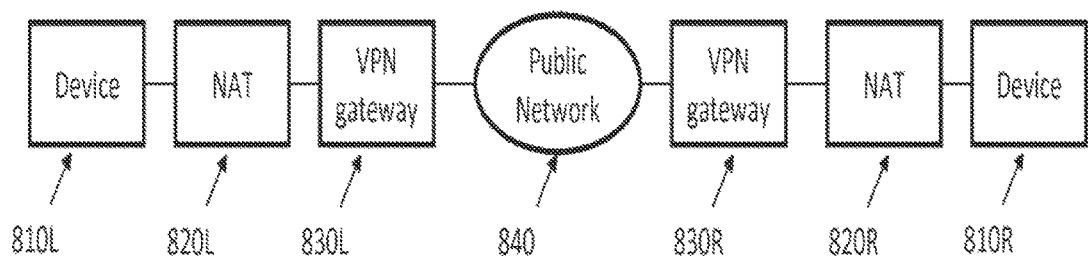
FIG. 9C illustrates a network architecture in which the local computer and the remote computer both employ corresponding network address translator devices.

FIGS. 9A-9C include block diagrams systems that use a network address translation device for connecting local devices 810 of a private network to a public network 840.

FIG. 9A illustrates a network in which devices of a local computer 810L communicate with devices of a remote computer 810R via a virtual private network. Specifically, each device 810L, 810R uses a local IP address to connect to a corresponding VPN gateway 830L, 830R. Each VPN gateway 830L, 830 R, in turn, connects its corresponding device, using a static or dynamically assigned public IP address (e.g. using Dynamic Host Configuration Protocol (DHCP) service provided by the network's Internet Service Provider (ISP)), to the public network 840.

FIG. 9B illustrates a network architecture in which the local computer 810L uses a network address translator device (NAT) 820. Specifically, the local computer 810 uses a block of local addresses to communicate with the NAT 820L. The NAT 820L translates the local addresses to corresponding private addresses that are used by the VPN gateway 830L in establishing a connection with the local computer 810L. The VPN gateway 830L employs a static or dynamically assigned public address to connect the local computer to a public network 840. On the remote computer side, the VPN gateway 830R communicates with the public network 840 using a static or dynamically assigned public IP address. The VPN gateway 830R also communicates with the remote computer 810R using private addresses assigned to the remote computer 810R.

FIG. 9C illustrates a network architecture in which the local computer 810R and the remote computer 810L both employ corresponding NAT devices 820R, 820L. Specifically, the local computer 810 uses a block of local addresses to communicate with the NAT 820L. The NAT 820L translates the local addresses to corresponding private addresses that are used by the VPN gateway 830L in establishing a connection with the local computer 810L. The VPN gateway 830L employs a static or dynamically assigned public address to connect the local computer to a public network 840. On the remote computer side, the VPN gateway 830R communicates with its corresponding NAT device 820R using a block of private addresses. The NAT device 820R translates the private addresses into corresponding local addresses that are used to communicate with the remote device 810R.

For example in FIG. 9C, if the network behind 820/830L is 192.168.1.0/255.255.255.0 where device 810L has the address 192.168.1.5 and the network behind 820/80R is 10.10.1.0/255.255.255.0 where device 810R has the address 10.10.1.4, then the two local area networks (LANs) are using non-conflicting private address blocks which may be used instead of randomly generated blocks for the VPN. However, if the left network behind 820/830L and the right network behind 820/830R are both using 192.168.1.0/255.255.255.0, the VPN tunnel to each other using their existing LAN addresses may have conflicting addresses. In this case, certain embodiments generate non-conflicting addresses for each side. For example 10.10.1.0/255.255.255.0 for the left side, and 10.10.2.0/255.255.255.0 for the right side. The left NAT device performs one-to-one NAT for the 192.168.1.0 addresses representing them as 10.10.1.0 addresses through the VPN to the right LAN, and the right LAN also performs one-to-one NAT on the 192.168.1.0 addresses representing them as 10.10.2.0 addresses to the left LAN through the VPN tunnel. Note that generated private address are required on both the left and right sides when the LAN address conflict so that each side can both communicate with its local devices and with remote devices through the VPN. If only a few LAN devices need to be made available through the VPN to other parties 810, the generated address block used to represent the VPN via the NAT device 820 does not need to be the same size as the LAN address block. It may be a smaller address block where only VPN accessible devices are translated to a VPN accessible address in the NAT device 820.

In some embodiments, when selecting an address block for a LAN-to-LAN VPN, each LAN may use a private address block that does not conflict with other LANs. In such embodiments, there is no need to generate an address block (e.g., randomly) and the LAN addresses may be used. If each LAN is also holding a VPN with a number of other LANs, these address blocks also do not conflict with all parties with VPNs where they are routing packets. In an event there is an address block conflict, certain embodiments may generate non-conflicting addresses to represent the addresses on the LAN, which has the conflicting addresses. The VPN device for that LAN may perform one-to-one network address translation (NAT) where each conflicting address on the LAN is changed to an address in the generated address block for representation to the peer VPN device. In the case where only a subset of the addresses on the LAN need to be made available via VPN, a smaller block of generated addresses may be used to represent the LAN, where the VPN available addresses are translated one-to-one for addresses in the smaller generated address block made available and routed through the VPN.

In certain embodiments, unique private addresses may be used for performing at least one of host-to-host, host-to-network, or network-to-network VPN tunnels. For example, calculated tunnel addresses may be published to a Domain Name Service (DNS) such that VPN peers can find a new host via the VPN tunnel and DNS requests. When a VPN device is conducting multiple VPNs with multiple peer hosts and/or networks, a new VPN may be brought up where the VPN tunnel address or address block may not be available on the new VPN device. In order to overcome these difficulties, certain embodiments may allow for various VPN peers to reach the device via different addresses. In such embodiments, multiple addresses by peer are published to the secure DNS and the secure DNS resolves the name to the appropriate address based on the requestor.

In some embodiments, existing VPNs may be renegotiated to ensure that all VPNs use the same VPN address or address block. This has an impact on the secure DNS. In such embodiments, the named device is represented by one unique address independent of the requestor and only one address is published to the DNS for the name.

In some embodiments, the DNS service containing name and VPN address pairs may only be available to the VPN devices. In certain embodiments, access to a DNS service may be limited. For example, a DNS service may be limited to a certain internal network, a set of network address, or may require authentication.

In certain embodiments, VPN addresses may be calculated and/or VPNs may instantiated in response to a DNS request. In such embodiments, the host or network initiating the VPN, may receive a DNS request, determine if the host/network has permission to do the VPN with the peer host or network, perform the exchange to calculate the private addresses and to setup the VPN, set up the VPN, and, knowing the VPN IP address for the peer, return this address for the DNS request where the communications that triggered the DNS request now takes place over the newly created VPN.

Figure 10:
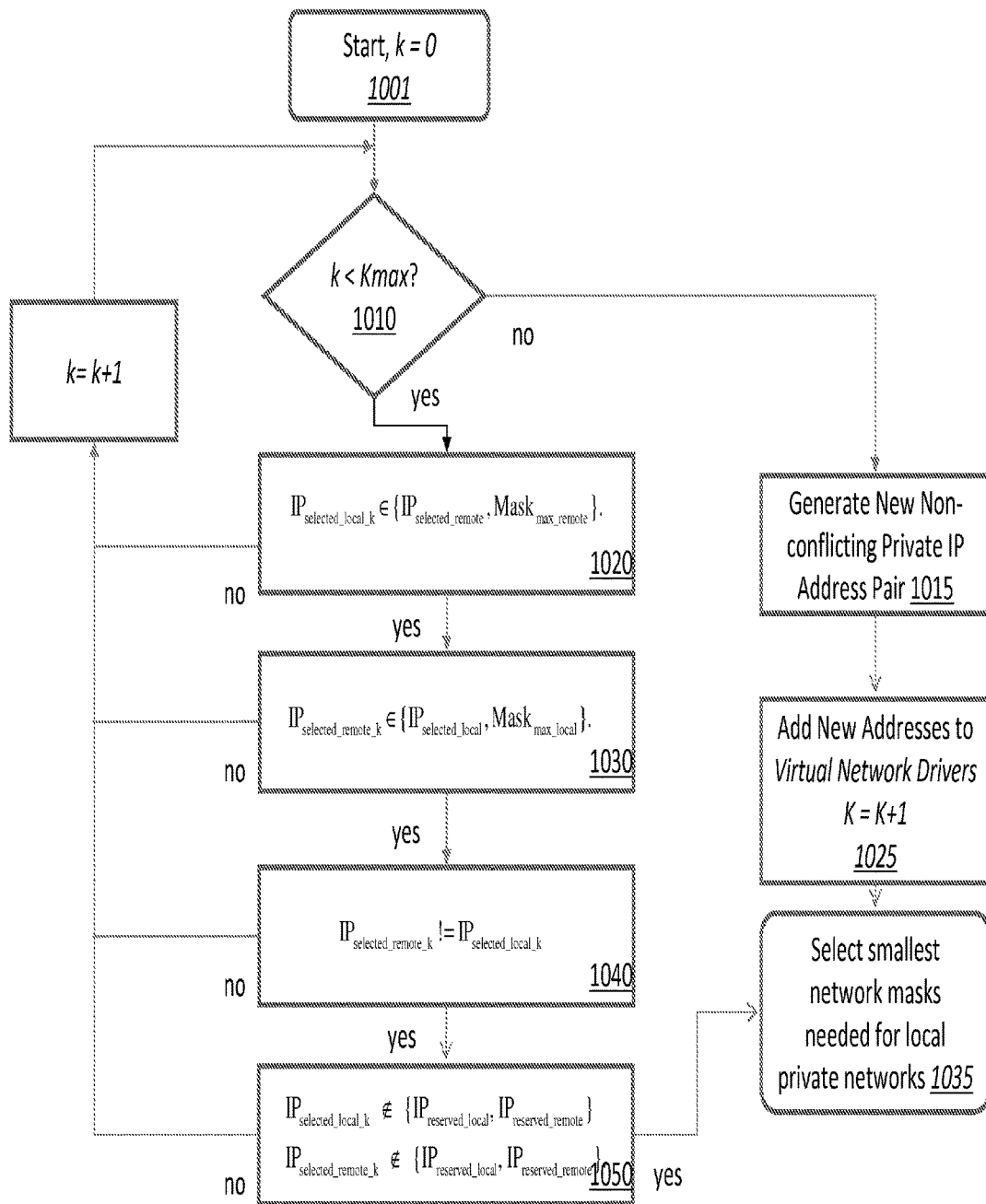
FIG. 10 is a flow diagram for selecting network mask addresses according to certain embodiments disclosed herein.

FIG. 10 is a flow diagram for selecting network mask addresses according to certain embodiments disclosed herein. In some embodiments, the procedures may begin by initializing an index value k, for example, by setting its value to zero (i.e., k=0) 1001. The value of k is checked against a maximum address block size, $k_{max}$, 1010.

If $k \geq k_{max}$, a new non-conflicting private address pair is generated 1015. The generated non-conflicting private address pair is assigned 1025 to the virtual network driver of the local computer 10 (denoted by $IP_{selected\_local\_k}$) and also to the virtual network driver of the remote computer 34 (denoted by $IP_{selected\_remote\_k}$). The generated addresses, namely $IP_{selected\_local\_k}$ and $IP_{selected\_remote\_k}$, are used to select the smallest network mask address block that may be used to establish communications between the local computer and the remote computer 1035.

If $k \leq k_{max}$, the procedures described herein determine whether the k-th selected IP address block of the local computer, namely $IP_{selected\_local\_k}$, is contained in the set of available addresses of the remote computer (e.g., within a pre-allocate block of addresses which do not conflict with addresses is being used by the remote computer or a device associated with the remote computer 1020). Specifically, the procedures determine whether $$IP_{selected\_local\_k} \in \{IP_{selected\_remote}, Mask_{max\_Remote}\}.$$

If the k-th selected IP address block of the local computer, $IP_{selected\_local\_k}$, is not within the set of available addresses of the remote computer, the value of index k is reset, for example, by setting k=k+1, and once again checked against the maximum address block size $k_{max}$ 1010. Once the value of index k is reset, the procedures proceed to verify possible conflicts for the next address in the address block, namely the k-th+1 address block.

However, in an event it is determined that the k-th selected local IP address block is contained in the set of available addresses of the remote computer, the procedures described herein proceed by determining whether the k-th selected IP address block of the remote computer, namely $IP_{selected\_remote\_k}$, conflicts with existing addresses of the local computer (e.g., if the address is being used by the local computer or a device associated with the local computer) or a maximum network mask value that has been reserved by the local computer 1030. Specifically, the address negotiation procedures determine whether $$IP_{selected\_remote\_k} \in \{IP_{reserved\_local}, Mask_{max\_local}\}.$$

If the k-th selected IP address block of the remote computer, $IP_{selected\_remote\_k}$, is not within the set of available addresses of the local computer, the value of index k is reset, for example, by setting k=k+1, and once again checked against the maximum address block size $k_{max}$ 1010. Once the value of index k is reset, the procedures proceed to verify possible conflicts for the next address in the address block, namely the k-th+1 address block.

However, in an event it is determined that the k-th selected remote IP address block is contained in the set of available addresses of the local computer, the procedures described herein proceed by determining whether the k-th selected IP address block of the local computer, namely $IP_{selected\_local\_k}$, is the same address as the k-th selected IP address block of the remote computer, namely $IP_{selected\_remote\_k}$ 1040. Specifically, in some embodiments, the procedures may determine whether:

$$IP_{selected\_local\_k}!=IP_{selected\_remote\_k},$$

where operator ! is a logical "not" operator.

If the k-th selected IP address block of the local computer, $IP_{selected\_local\_k}$, is determined to be the same address as the k-th selected IP address block of the remote computer, namely $IP_{selected\_remote\_k}$ (i.e., $IP_{selected\_local\_k}!=IP_{selected\_remote\_k}$ is false), the value of index k is reset, for example, by setting k=k+1, and once again checked against the maximum address block size $k_{max}$ 1010. Once the value of index k is reset, the procedures proceed to verify possible conflicts for the next address in the address block, namely the k-th+1 address block.

However, if the k-th selected IP address block of the local computer, $IP_{selected\_local\_k}$, is determined not to be the same address as the k-th selected IP address block of the remote computer, namely $IP_{selected\_remote\_k}$ (i.e., $IP_{selected\_local\_k}!=IP_{selected\_remote\_k}$ is true), procedures described herein proceed by determining whether the k-th selected IP address block of the local computer, namely $IP_{selected\_local\_k}$, belongs to a set defined by all reserved addresses of the local computer (i.e., addresses being used by the local computer or a device associated with the local computer) and all reserved addresses of the remote computer (i.e., addresses being used by the remote computer or a device associated with the remote computer) 1050. Additionally, the address negotiation procedures described herein proceed by determining whether the k-th selected IP address block of the remote computer, namely $IP_{selected\_remote\_k}$, belongs to a set defined by all reserved addresses of the local computer (i.e., addresses being used by the local computer or a device associated with the local computer) and all reserved addresses of the remote computer (i.e., addresses being used by the remote computer or a device associated with the remote computer). Specifically, the procedures determine whether $$IP_{selected\_local\_k} \notin \{IP_{reserved\_local}, IP_{reserved\_remote}\}$$

and $$IP_{selected\_remote\_k} \notin \{IP_{reserved\_local}, IP_{reserved\_remote}\}.$$

If the k-th selected IP address block of the local computer, $IP_{selected\_local\_k}$, is determined to belong to the set defined by reserved VPN addresses (i.e., the set, $\{IP_{reserved\_local}, IP_{reserved\_remote}\}$, defined by all reserved addresses of the local computer and all reserved addresses of the remote computer), namely if it $IP_{selected\_local\_k} \not\in \{IP_{reserved\_local}, IP_{reserved\_remote}\}$ is determined to be false or the k-th selected IP address block of the remote computer, $IP_{selected\_remote\_k}$, is determined to belong to the set defined by reserved VPN addresses (i.e., the set, $\{IP_{reserved\_local}, IP_{reserved\_remote}\}$, defined by all reserved addresses of the local computer and all reserved addresses of the remote computer), namely if it $IP_{selected\_remote\_k} \not\in \{IP_{reserved\_local}, IP_{reserved\_remote}\}$ is determined to be false, the value of index k is reset, for example, by setting k=k+1, and once again checked against the maximum address block size $k_{max}$ 1010. Once the value of index k is reset, the procedures proceed to verify possible conflicts for the next address in the address block, namely the k-th+1 address block.

However, if the k-th selected IP address block of the local computer, $IP_{selected\_local\_k}$, is determined not to belong to the set defined by reserved VPN addresses (i.e., if it $IP_{selected\_local\_k} \not\in \{IP_{reserved\_local}, IP_{reserved\_remote}\}$ is determined to be true)) and the k-th selected IP address block of the remote computer, $IP_{selected\_remote\_k}$, is determined not to belong to the set defined by reserved VPN addresses (i.e., if it $IP_{selected\_remote\_k} \not\in \{IP_{reserved\_local}, IP_{reserved\_remote}\}$ is determined to be true), the procedures described herein proceed by selecting the smallest block of network mask addresses that may be used to establish communications between the local computer and the remote computer 1035.

Figure 11:
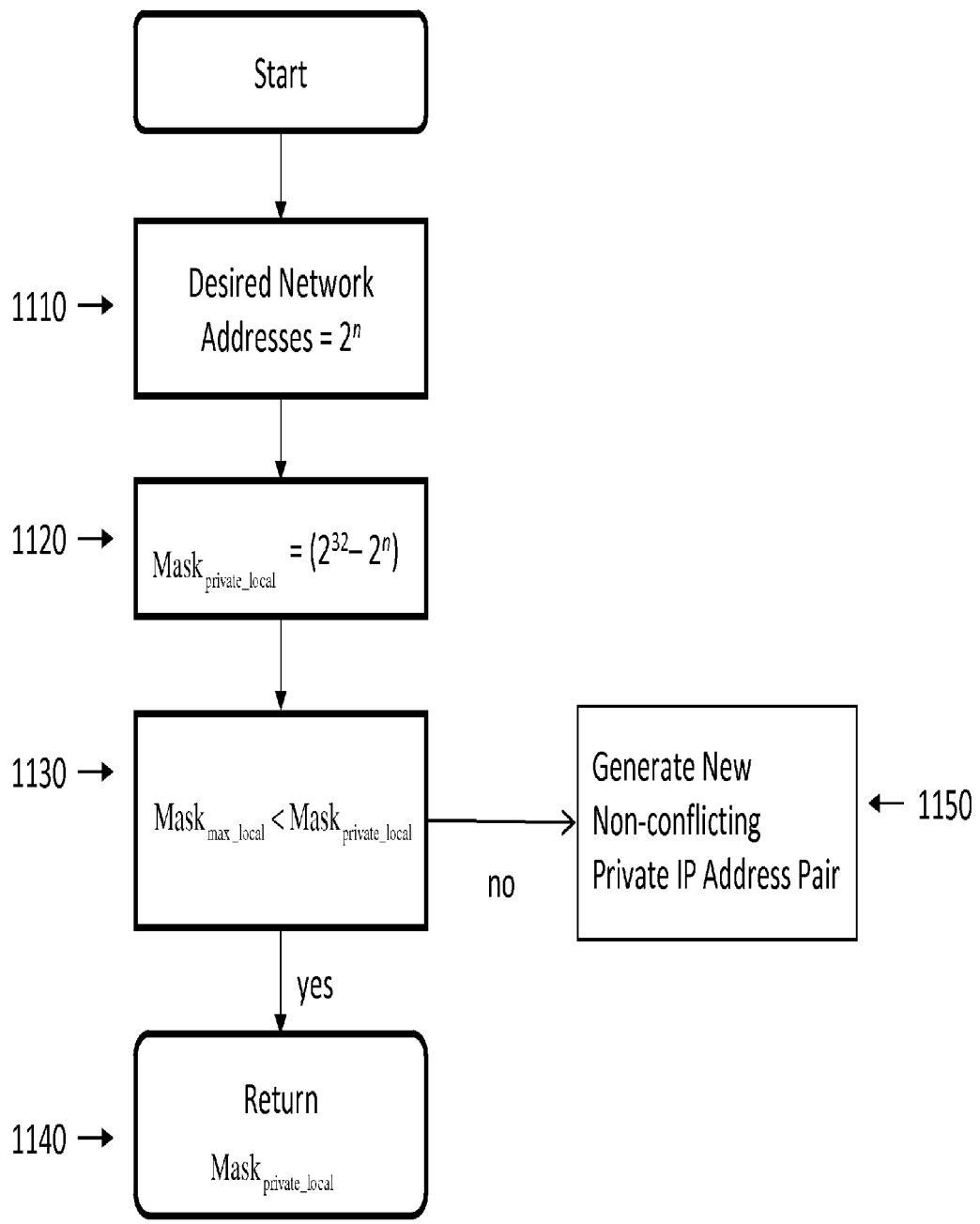
FIG. 11 is a flow diagram of procedures for selecting a non-conflicting private network mask address block.

FIG. 11 is a flow diagram of procedures for selecting a non-conflicting private network mask address block. The procedures begin by determining the total number of desired private local addresses 1110. For example, in certain embodiments, the total number of the desired addresses may be $2^n$, where n is a finite number. The maximum number of private network mask addresses is also initialized. For example, in one embodiment, the network mask providing the total number of desired addresses is determined as $2^{32}-2^n$ (since each IP address is a 32-bit address).

The total number of desired private local addresses is compared against the maximum number of private network addresses ($Mask_{max\_local} < Mask_{private\_local}$) 1130 and if the desired number of private local addresses is larger than the number of private network mask addresses, a new non-conflicting address pair, $IP_{selected\_local}$, $IP_{selected\_remote}$, as described with reference to FIG. 7 is generated 1150.

However, if the desired number of private local addresses is smaller than the number of private network mask addresses, the maximum number assigned to the network mask address is selected as a non-conflicting mask address 1140.

Figure 12:
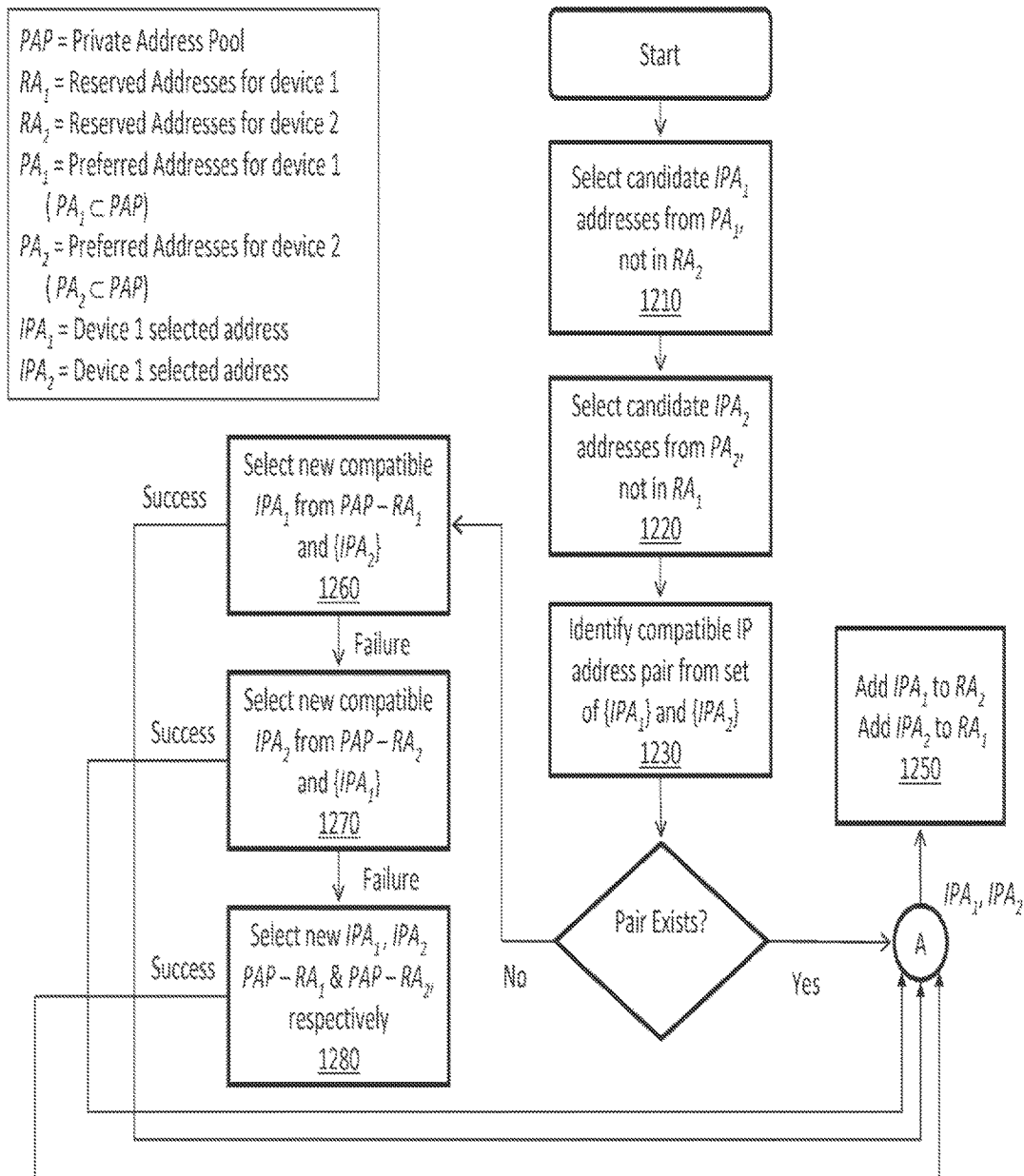
FIG. 12 is a flow diagram of procedures for selecting non-conflicting network address pairs according to certain embodiments described herein.

FIG. 12 is an example of procedures for selecting non-conflicting network address pairs according to certain embodiments described herein. In order to determine a non-conflicting address pair that can be used to establish communications between two network devices, namely device 1 and device 2, a candidate preferred address (PA1) for the first device is selected 1210 from a pool of private addresses (PAP) that do not include reserved addresses of device 1 (RA1). Specifically, the candidate preferred addresses of device 1 (PA1) are selected such that:

(PA1 ⊂ PAP) & (PA1 ⊄ RA1).

Similarly, a candidate preferred address (PA2) for the second device is selected 1220 from a pool of private addresses (PAP) that do not include reserved addresses of device 2 (RA2). Specifically, the candidate preferred addresses of device 2 (PA2) are selected such that:

(PA2 ⊂ PAP) & (PA2 ⊄ RA2).

Compatible IP address pairs, from among the addresses included in the candidate preferred addresses of device 1 (PA1) and the candidate preferred addresses of device 1 (PA2), are selected 1230.

If a compatible address for a candidate address is found, that address is added 1250 to the reserved addresses of the other device 1250. Specifically, if a selected address for device 1, IPA1, is determined to be compatible with a selected address for device 2, IPA2, the selected address for device 1, IPA1, is added to reserved addresses of device 2, RA2, and the selected address for device 2, IPA2, is added to reserved addresses of device 1, RA2.

If a compatible address for a candidate address is not found, a new compatible address, IPA1, is selected 1260 for device 1. The new compatible address pair is selected from among the pool of private addresses (PAP) that do not include reserved addresses of device 1 (RA1) and the selected address for device 2. IPA2. If the new compatible address. IPA1, is successfully obtained for device 1, the compatible address pair is added 1250 to the reserved addresses of device 1 and device 2. Specifically, IPA1, is added to the reserved addresses of device 2, RA2, and the selected address for device 2, IPA2, is added to the reserved addresses of device 1, RA2.

If a compatible address for a candidate address is not found, a new compatible address, IPA2, is selected 1270 for device 2. The new address pair is selected from among the pool of private addresses (PAP) that do not include reserved addresses of device 2 (RA2) and the selected address for device 1, IPA1. If the new compatible address, IPA2, is successfully obtained for device 2, the compatible address pair is added to the reserved addresses of device 1 and device 2. Specifically, IPA1, is added to the reserved addresses of device 2, RA2, and the selected address for device 2, IPA2, is added to the reserved addresses of device 1, RA2.

If a compatible address for a candidate address is not found, new addresses, IPA1 and IPA2, are selected 1280 for device 1 and device 2, respectively. The new address IPA1 is selected from among the pool of private addresses (PAP) that do not include reserved addresses of device 1 (RA1) and the new address IPA2 is, similarly, selected from among the pool of private addresses (PAP) that do not include reserved addresses of device 2 (RA2). The new address pair is added 1250 to the reserved addresses of device 1 and device 2. Specifically, IPA1, is added to the reserved addresses of device 2, RA2, and the selected address for device 2, IPA2, is added to the reserved addresses of device 1, RA2.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A local device, on a first local network, for automatically avoiding address conflicts when communicating securely over a public network with a remote device, located outside the local network in a second local network, the local device comprising:
   a network driver; and
   at least one processor configured to:
      identify a block of local network addresses that do not conflict with the reserved local network addresses;
      select a first network address from the block of local network addresses;
      assign, to the network driver, the selected first network address;
      negotiate, with the remote device, using the block of local network addresses except for the selected first network address, from which to select a second network address that does not conflict with local addresses on the second local network; and
      communicate securely with the remote device using the network driver based on the selected second network address.

2. The local device of claim 1, wherein the local device is a mobile device.

3. The local device of claim 1, wherein the remote device is a mobile device.

4. The local device of claim 1, wherein the network driver is a software module.

5. The local device of claim 1, wherein the network driver includes a first network driver for communicating securely and a second network driver, and the one or more processors are configured to provide a block of local network addresses to the first network driver and not to the second network driver.

6. The local device of claim 1, wherein the local network addresses are private network addresses on the local network.

7. The local device of claim 1, wherein the public network is external to the local network.

8. The local device of claim 1, wherein, to communicate securely, the one or more processors are configured to encrypt packets transmitted to the remote device over the public network.

9. The local device of claim 1, wherein, to communicate securely, the one or more processors are configured to control the network driver to communicate with the remote device over the public network using a secure communication link.

10. The local device of claim 1, wherein, to communicate securely, the one or more processors are configured to control the network driver to communicate with the remote network device using a communication link over a virtual private network.

11. The local device of claim 10, wherein, for the communication link over the virtual private network, the one or more processors are configured to encapsulate at least one of a private address of the local device or a private address of the remote device with the selected second network address and to encrypt the at least one of the private address of the local device or the private address of the remote device.

12. The local device of claim 1, wherein the one or more processors are configured to add the selected second network address to the reserved local network addresses.

13. The local device of claim 12, wherein the one or more processors are configured to remove selected second network address from the reserved local network addresses when a communication session between the local device and the remote device ends.

14. The local device of claim 1, wherein each of the local network addresses includes an IP address and network mask.

15. The local device system of claim 1, wherein the one or more processors are further configured to perform one or more of the identification, assignment, and negotiation operations in response to a name service request for a name corresponding to the remote device.

16. The local device of claim 1, wherein the communication with the remote device is a host-to-host connection or a host-to-network connection.

17. A method, performed by a local device on a local network, for automatically avoiding address conflicts when communicating securely over a public network with a remote device, located outside the local network in a second local network, the method comprising:

identifying local network addresses on the local network reserved for use;

identifying a block of local network addresses that do not conflict with the reserved local network addresses;

select a first network address from the block of local network addresses;

assign, to the network driver, the selected first network address;

negotiate, with the remote device, using the block of local network addresses except for the selected first network address, from which to select a second network address that does not conflict with local addresses on the second local network;

and communicating securely with the remote device using the network driver based on the selected second network address.

18. The method of claim 17, wherein the local device is a mobile device.

19. The method of claim 17, wherein the remote device is a mobile device.

20. The method of claim 17, wherein the network driver is a software module.

21. The method of claim 17, wherein the network driver includes a first network driver for communicating securely and a second network driver, the method further includes provide a block of local network addresses to the first network driver and not to the second network driver.

22. The method of claim 17, wherein the local network addresses are private network addresses on the local network.

23. The method of claim 17, wherein the public network is external to the local network.

24. The method of claim 17, wherein communicating securely includes encrypting packets transmitted to the remote device over the public network.

25. The method of claim 17, wherein communicating securely includes communicating with the remote device over the public network using a secure communication link.

26. The method of claim 17, wherein communicating securely includes communicating with the remote network device using a communication link over a virtual private network.

27. The method of claim 26, wherein using the communication link over the virtual private network includes encapsulating at least one of a private address of the local device or a private address of the remote device with the selected second network address and encrypting the at least one of the private address of the local device or the private address of the remote device.

28. The method of claim 17, further comprising adding the selected second network address to the reserved local network addresses.

29. The method of claim 28, further comprising removing the selected second network address from the reserved local network addresses when a communication session between the local device and the remote device ends.

30. The method of claim 17, wherein each of the local network addresses includes an IP address and network mask.

31. The method of claim 17, further comprising performing one or more of the identification, assignment, and negotiation steps in response to a name service request for a name corresponding to the remote device.

32. The method of claim 17, wherein the communication with the remote device is a host-to-host connection or a host-to-network connection.

* * * * *